Sept. 19, 1967      J. G. LEWIS      3,343,016

MOTOR BEARING SUPPORT BRACKET

Filed Aug. 30, 1965      2 Sheets-Sheet 1

INVENTOR
JOHN G. LEWIS
BY Charles E. Markham
HIS AGENT

Sept. 19, 1967  J. G. LEWIS  3,343,016

MOTOR BEARING SUPPORT BRACKET

Filed Aug. 30, 1965  2 Sheets-Sheet 2

INVENTOR
JOHN G. LEWIS
BY Charles E. Markham
HIS AGENT

United States Patent Office 3,343,016
Patented Sept. 19, 1967

3,343,016
MOTOR BEARING SUPPORT BRACKET
John G. Lewis, Dellwood, Mo., assignor to Emerson Electric Co., St. Louis, Mo., a corporation of Missouri
Filed Aug. 30, 1965, Ser. No. 483,709
5 Claims. (Cl. 310—90)

ABSTRACT OF THE DISCLOSURE

Electric motor bearing support means in which a bearing supporting hub is provided with circularly arranged radial slots in a face thereof and in which a plurality of circularly arranged radial legs fixed at their outer ends to the motor stator have their inner ends entered into the radial slots in said hub and are connected therein and in which said legs are relatively stiff in an axial plane and relatively flexible in a transverse plane.

---

This invention relates to electric motor construction and particularly to means supporting the motor shaft bearings in relationship with the stator.

An object of the invention is the provision of novel means in an electric motor rotatably supporting the rotor centrally in the stator, which means consists of parts which are particularly simple and inexpensive to manufacture and assemble.

A further object is to provide means supporting the motor shaft bearings on the stator, which means provides a rigid connection between the motor bearings and the stator in any plane parallel to or perpendicular to the axis of the motor shaft yet is resilient to torsional forces, thereby functioning to damp the transmission of torsional vibrations between the stator and the shaft bearings.

A further object is to provide bearing and motor support means comprising a central motor mounting hub portion including a motor bearing and circularly arranged radial leg members connecting the hub portion of the periphery of the motor stator, which leg members have such cross-sectional configurations as to provide a rigid connection between said stator and motor mounting hub against relative translational movement parallel to or perpendicular to the motor shaft but which flex in response to torsional forces to permit slight, relative, rotational movement of the stator and mounting hub portion thereby to damp transmission of torsional vibrations from the stator to the hub portion.

Further objects and advantages will appear from the following description when read in connection with the accompanying nrawings.

Figure 2:
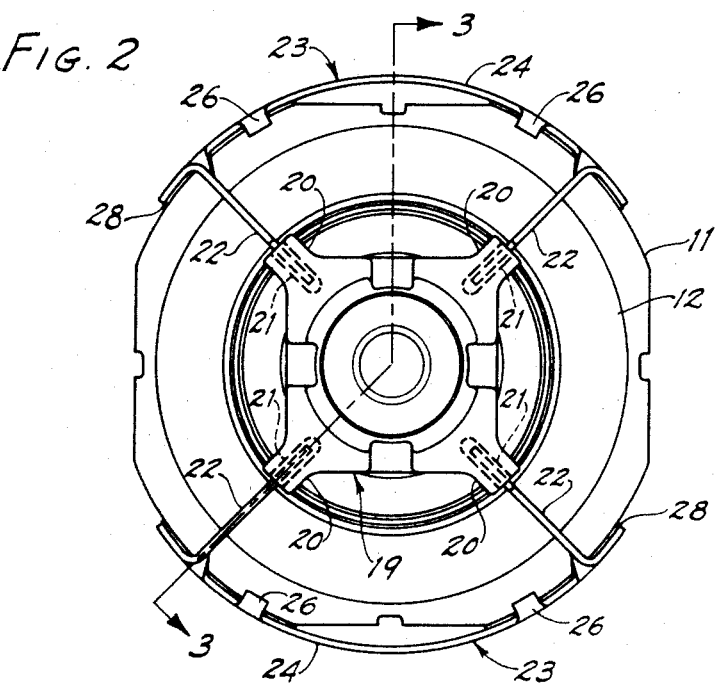
FIG. 2 is an end view of the motor shown in FIG. 1.
Figure 1:
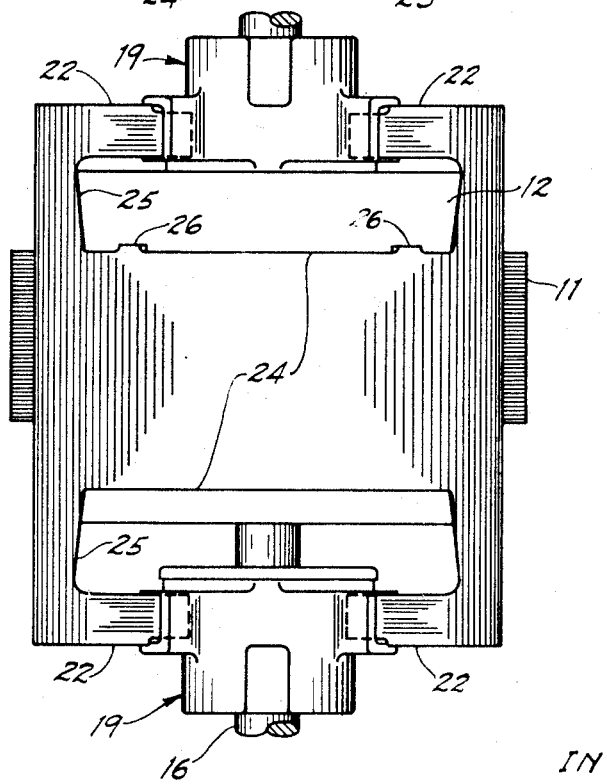
FIG. 1 is a top plan view of an electric motor constructed in accordance with the present invention.

Referring to the drawings, the motor comprises a stator, generally indicated at 10, including a laminated core 11 and a winding 12, a rotor, generally indicated at 13, including a core 14, windings 15, and a drive shaft 16. The drive shaft is journalled at opposite ends of the rotor in a pair of sleeve bearings 17 which are press fitted in bores 18 in a pair of hub members generally indicated at 19. The hub members 19 are preferably formed as castings, and each includes four, circularly arranged, radially projecting bosses 20 in each of which is formed a radially extending slot 21.

The radial slots 21 in hub members 19 receive in free fit relationship the end portions of radial legs 22 which are formed as an integral part of a pair of support brackets generally indicated at 23. The support brackets 23 are preferably formed from sheet metal, and each includes an arcuate saddle portion 24, preferably formed so as to conform to some portion or spaced portions of the periphery of the stator core which it overlies, and four leg portions 22 which extend radially inward from the four corners of the arcuate saddle portion 24. The pair of support brackets 23 overlie diametrically opposed portions of the periphery of the stator core 11, and two radial legs from each support bracket 23 enter two of the four radial slots 21 of each hub 19.

In fabricating support brackets 23 intermediate cutouts 25 are made, one on each side of the saddle portion 24, which detach the leg portions 22 therefrom to permit the inward forming thereof. Also, these cutouts 25 are sufficiently wide so that the axial spacing between the two pairs of legs of each support bracket is considerably greater than the width of the saddle portion 24, whereby the hub members 19 are axially spaced outwardly from the ends of the stator core 11. Adjacent sides of the saddle portions 24 of support brackets 23 are each provided with a pair of inwardly formed locating tabs 26 which abut one face of the stator core 11 thereby to axially locate support brackets 23 thereon.

The saddle portions 24 of the support brackets are attached to the periphery of the stator core 11 by any suitable means such as welding, soldering, or cementing. The end portions of radial legs 22, which fit freely in the radial slots 21 of the hub members, are however, cemented therein by a cementing material which is applied in pliable form and sets up hard to effect the rigid connection of the hub members to the support brackets. I prefer to use an adhesive epoxy resin 28 in stiff pasty form, which sets up in a relatively short time at a moderate baking temperature.

The legs 22 are considerably wider than the thickness of the sheet stock from which they are formed, and their flat sides lie parallel with the axis of the motor shaft so that they form a rigid connection between the hub members and the motor stator core against any concentrically applied axial force tending to move the hub members axially and against any non-concentric axial force tending to tilt the hub portions from perpendicularity with the axis of the shaft. The legs 22 are also circularly arranged about the hub members at 90° intervals so as to provide a rigid connection between the hub members and the stator against any force applied perpendicular to the motor shaft in the manner of the spokes of a wheel. The number of circularly arranged legs 22 employed may, of course, be increased, if desired, without departing from the spirit of the invention.

Torsional forces, on the other hand, tending to rotate the hub member relative to the stator are resisted entirely by the flexural strength of the legs 22 flatwise. This is an important feature of the invention inasmuch as by selection of suitable sheet stock a desired controlled resiliency effective to damp out torsional vibrations may be accomplished with a pair of simple, inexpensive, punch press parts which maintain at the same time a sufficiently rigid connection against axial or lateral translational tilting movement of the bearing supporting hub members.

The foregoing arrangement also provides a bearing support means which is particularly simple and inexpensive to manufacture and assemble with assurance that concentricity of the rotor in the stator will be achieved. Upon assembly, the rotor is positioned concentrically and axially in the stator bore and is held firmly in this position by elongated arcuate shims placed between the rotor and stator bore. The support brackets 23 with cementing material 28 in soft form applied to the inner surfaces of the saddle portions 24 thereof are then positioned diametrically oppositely on the periphery of the stator core with locating tabs 26 bearing against one face of the stator core. The hub members 19, having cementing material 28 substantially filling the radial slots 21, are now slipped on the opposite ends of the drive shaft and the legs 22 are entered into the slots edgewise.

Figure 3:
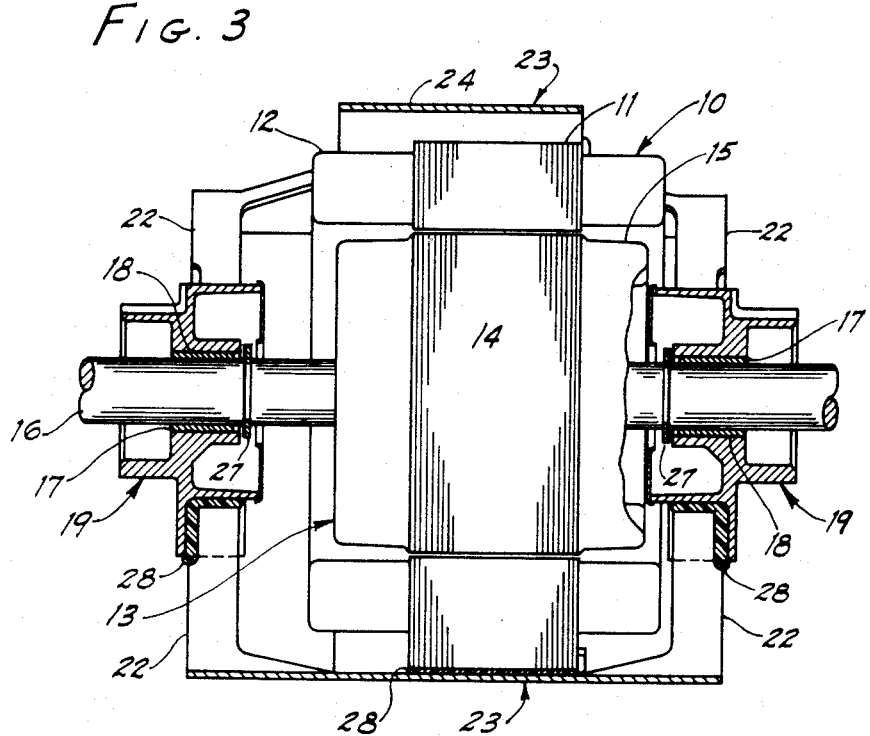
FIG. 3 is a cross-sectional view of the motor shown in FIG. 2 and is taken on line 3—3 of FIG. 2.

Stop collars 27 on drive shaft 16 limit the inward movement of the hub members upon assembly so as to reserve some space between the outer edges of legs 22 and the bottom of slots 21 for cement and to accommodate manufacturing tolerances of misalignment of the legs in an axial direction, and the length of the legs 22 is such as to reserve space between the ends of legs 22 and the inner ends of slots 21 for cement and to accommodate manufacturing dimensional variations along the line of the radial legs, as shown in FIG. 3. The width of slots 21 is also made considerably greater than the thickness of legs 22 so as to provide ample space for cement and to accommodate manufacturing variations in angularity of legs 22, as shown in FIG. 2.

When the motor is attached to a support through the hub members 19, the resiliency of legs 22 permits a slight oscillation of the stator relative to the hub members and support, thereby damping transmission to the support of torsional vibrations originating in the stator. Notably smoother operation of the motor, due to the resiliency of legs 22, is also achieved, however, when the motor is attached to a support through the stator. This probably results because vibrations originating in either the stator or rotor, or in a motor driven member, include radial as well as torsional force components which periodically increase the radial pressure between the shaft and bearing sufficiently to effect the transmission of at least a portion of the torsional components back and forth between rotor and stator which would be undamped in the absence of a resilient connection such as legs 22.

The foregoing description is intended to be illustrative and not limiting, the scope of the invention being set forth in the appended claims:

I claim:

1. In an electric motor having a stator and a rotor including a drive shaft mounted for rotation in said stator, a hub member at one end of said stator surrounding said drive shaft, a bearing in said hub member journalling said one end of said shaft, means journalling the other end of said drive shaft, said hub member being provided with a plurality of circularly arranged radial slots in the inner face thereof extending inward from its periphery, a plurality of circularly arranged radially extending legs at one end of said stator, means connecting the outer ends of said legs to said stator, and said legs having their inner ends entered into said slots in said hub member, and said legs having a free fit in said slots and being cemented therein, whereby upon assembly of the motor said hub member and the bearing it carries may be slipped on said one end of said shaft and the inner ends of said free fitting leg members entered sideways into said slots in said hub member, thereby permitting the free alignment of said bearing on said shaft prior to cementing said inner ends of said legs in said slots.

2. In an electric motor having a stator and a rotor including a drive shaft mounted for rotation in said stator, a hub member at each end of said stator surrounding said drive shaft, a bearing in each of said hub members journalling one end of said shaft, each of said hub members being further provided with a plurality of circularly arranged radial slots in the inner faces thereof extending inward from their peripheries, a plurality of circularly arranged radial legs at each end of said stator, means connecting the outer ends of said legs to said stator and said legs having their inner ends entered into said slots in said hub members and said legs having a free fit in said slots and being cemented therein, whereby upon assembly of the motor said rotor may be shimmed in a concentric position in said stator and said radial legs fixedly connected at their outer ends to said stator and thereafter said hub members and the bearings therein may be slipped on the ends of the shaft and the inner ends of said free fitting leg members entered sideways into said slots in said hub members and cemented therein.

3. An arrangement as set forth in claim 2 in which half the number of radial legs at one end of said stator and half the number at the other end thereof are connected at their outer ends to a first arcuate band which overlies one portion of the periphery of said stator and is connected thereto, and the remaining half of the number of legs at both ends of the stator are connected at their outer ends to a second arcuate band which overlies and is connected to a diametrically opposed portion of the periphery of said stator.

4. In an electric motor having a stator and a rotor including a drive shaft mounted for rotation in said stator, a pair of stampings formed from sheet metal each comprising an arcuate saddle portion, which saddle portions of said pair of stampings overlie flatwise diametrically opposed portions of the periphery of said stator and are connected thereto, each of said stampings further including two pairs of integrally formed legs, one pair on each side of said saddle portion extending radially inward from said saddle portion toward the axis of said rotor, said legs being considerably wider than the thickness of the sheet stock from which said stampings are formed and said legs being obtained by longitudinal detachment of two metal strips along the intermediate portion of each side of each of said saddle portions and by the inward forming of these strips so that they are directed radially inward toward the axis of said rotor, a hub member at each end of said stator surrounding said drive shaft, a bearing fixed in each hub member journalling one end of said shaft, and the inner ends of said legs being connected to said hub members.

5. An electric motor as set forth in claim 4 in which said hub members are provided with radial slots loosely receiving the end portions of said legs, in which said end portions of said legs are cemented in said slots and in which said slots extend axially and are open at least on the inner face of said hub members, whereby said hub members with the bearings therein may be slipped on the ends of said drive shaft after said stampings are assembled and said end portions of said legs entered edgewise into said slots.

References Cited

UNITED STATES PATENTS

| | | | |
|---|---|---|---|
| 1,970,992 | 8/1934 | Wiberg | 308—28 X |
| 2,515,799 | 7/1950 | Rouy | 308—26 |
| 3,097,167 | 7/1963 | Beyerle | 308—143 X |
| 3,184,928 | 5/1965 | Desai et al. | 308—2 X |

FOREIGN PATENTS 1,125,306   7/1956   France.

ROY D. FRAZIER, *Primary Examiner.*

F. DOMOTOR, *Assistant Examiner.*